United States Patent [19]

Dawson

[11] Patent Number: 4,527,323

[45] Date of Patent: Jul. 9, 1985

[54] TUBING LOADING KEY

[75] Inventor: John R. Dawson, Barrington, Ill.

[73] Assignee: Cole-Parmer Instrument Company, Chicago, Ill.

[21] Appl. No.: 540,806

[22] Filed: Oct. 11, 1983

[51] Int. Cl.[3] .................... B23P 11/02; B23P 19/02; F04B 43/08

[52] U.S. Cl. .................... 29/451; 29/450; 29/235; 417/477

[58] Field of Search .................... 29/451, 235, 450; 417/477

[56] References Cited

U.S. PATENT DOCUMENTS

| | | | |
|---|---|---|---|
| 3,358,609 | 12/1967 | Worth et al. | 417/477 |
| 4,138,205 | 2/1979 | Wallach | 417/477 |
| 4,169,305 | 10/1979 | Kruszona | 29/235 |
| 4,172,313 | 10/1979 | Takahashi | 29/235 |
| 4,179,249 | 12/1979 | Guttmann | 417/477 |
| 4,211,519 | 7/1980 | Hogan | 417/477 |
| 4,231,725 | 11/1980 | Hogan | 417/477 |
| 4,267,631 | 5/1981 | Chase | 29/235 |
| 4,412,793 | 11/1983 | Stenberg et al. | 417/477 |

*Primary Examiner*—Howard N. Goldberg
*Assistant Examiner*—Steven Nichols
*Attorney, Agent, or Firm*—Fitch, Even, Tabin & Flannery

[57] ABSTRACT

This invention relates to a method of loading a compressible fluid flow tube of a peristaltic pump into a cavity between a rotor and reaction member carried by a housing and also relates to a tool or key facilitating such loading operation.

12 Claims, 7 Drawing Figures

Fig. 1
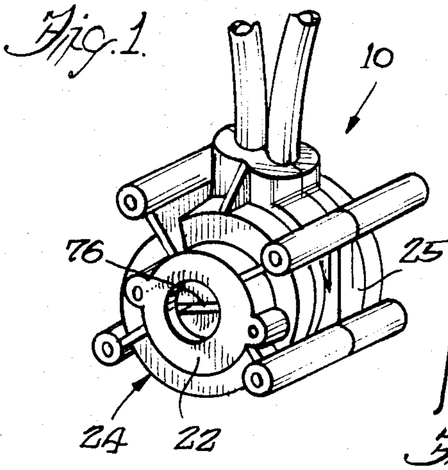
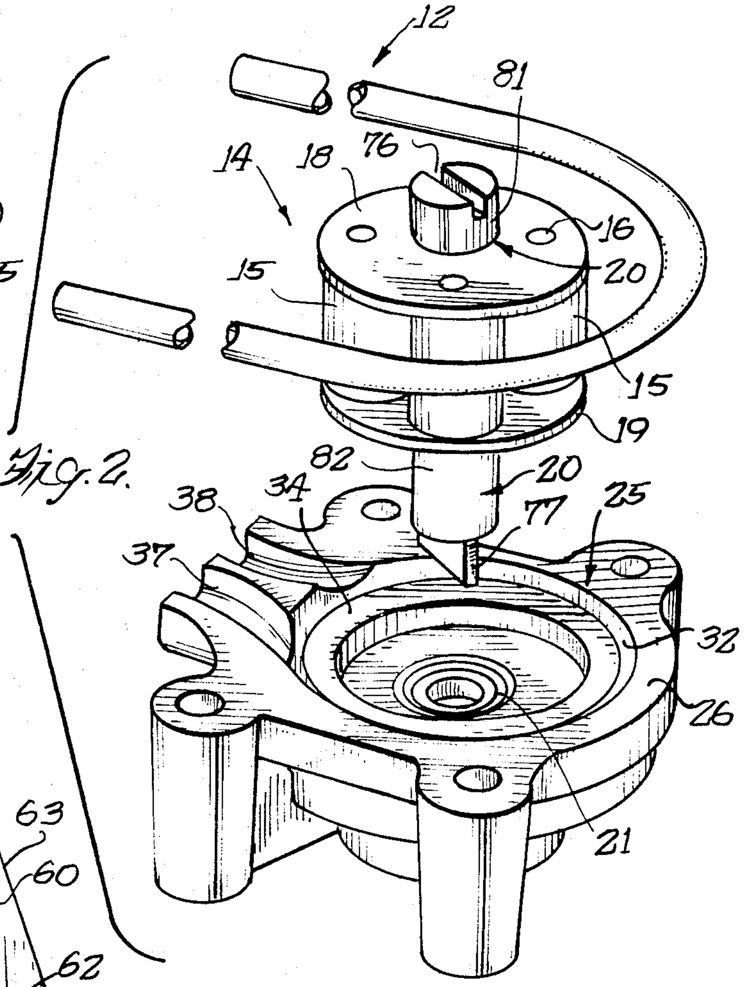
Fig. 2
Fig. 3
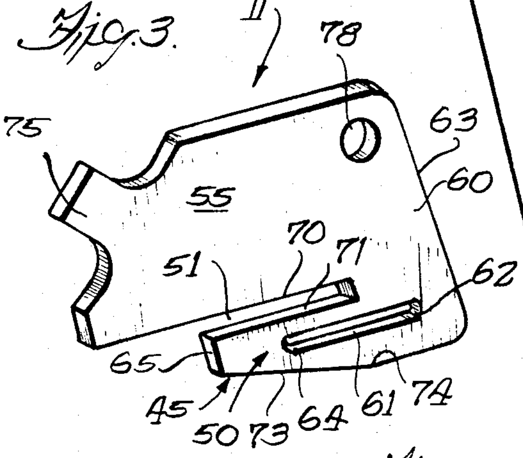
Fig. 4
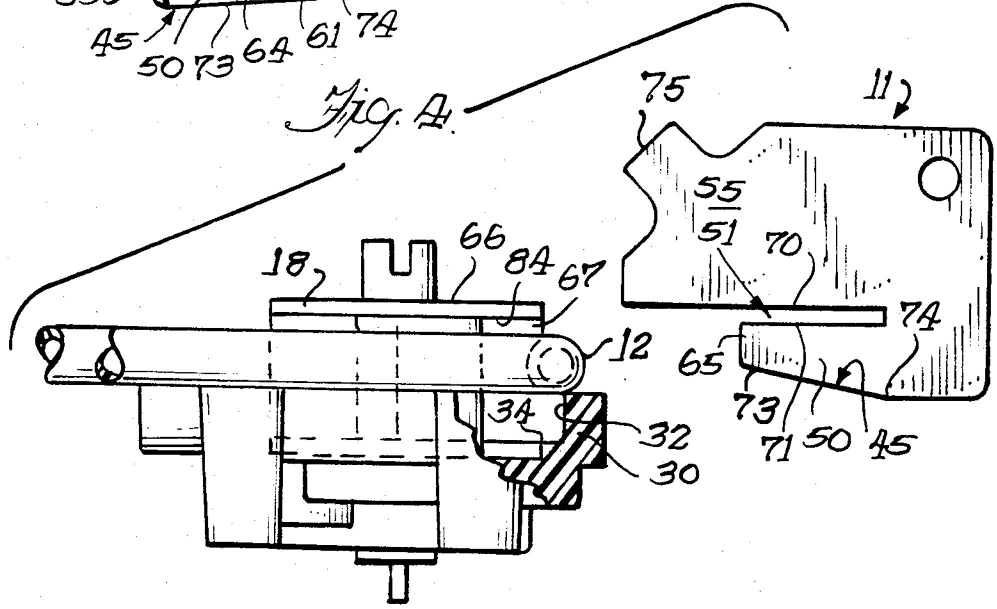

TUBING LOADING KEY

BACKGROUND OF THE INVENTION

The problem of loading a fluid-flow tube quickly and easily into a peristaltic pump has resulted in development of so-called quick-loading peristaltic pumps such as disclosed in U.S. Pat. No. 4,231,725 in which the reaction members are split in half to pivot to an open position to facilitate insertion or removal of the flow tube about the rotor. In the more common pumps, such as shown in U.S. Pat. No. 3,358,609, the reaction member is not split for pivoting to an open position but includes a continuous arcuate wall of at least about 180° and often 270° or more. The reaction member and the rotor define therebetween an arcuate slot or cavity into which must be inserted the flexible fluid flow tube. Typically the rotor carries at least two and usually three or more compression rollers each of which projects toward the reaction wall to define therewith a gap narrower than the relaxed diameter of the flow tube.

To load the flow tube into the cavity, it is necessary to squeeze the tubing to a smaller diameter than the normal relaxed diameter of the flow tube at the location of the rollers and this is at approximately three or more locations about rotor such as disclosed in the aforesaid patent.

It takes considerable manual dexterity for an individual to manually load the tube and to compress it between the compression roller and the adjacent portion of the reaction member while positioning the ends of the tube into grooves formed in the inlet and the outlet ends of the housing. For people lacking the manual dexterity, the loading of the tube is difficult. In some instances, the loading of the tube by inexperienced people results in the tube being stretched longitudinally when being pulled and wrapped about the rotor and pushed into the cavity. On the other hand, such a person may compress the tube longitudinally and insert too much tube into the cavity. Either a stretched or compressed tube affect the life of the tube and the performance characteristics of the pump. More specifically, stretching the tube reduces its internal diameter giving less flow and the stretched tubing experiences more stress thereby reducing its life. Thus, there is a need for a tool and better method of loading peristaltic pumps with the compressible flow tube.

Accordingly, a general object of the invention is to provide an improved method of loading a flow tube in a peristaltic pump.

A more specific object of the invention, is to provide a tool or key which is used to load the tube into the peristaltic pump.

These and other objects and advantages of the invention will become apparent from the following detailed description taken in connection with the accompanying drawings.

BRIEF DESCRIPTION OF THE DRAWINGS

FIG. 1 is a perspective view of a peristaltic pump which is to be loaded in accordance with the method and using the tool of the present invention.

FIG. 2 is an exploded view of the peristaltic pump showing the tube, and rotor and housing.

FIG. 3 is a perspective view of a tool or key constructed in accordance with the preferred embodiment of the invention.

FIG. 4 is an elevational view showing the key to be inserted into interfitting relationship with the rotor.

DETAILED DESCRIPTION OF THE INVENTION

Figure 5:
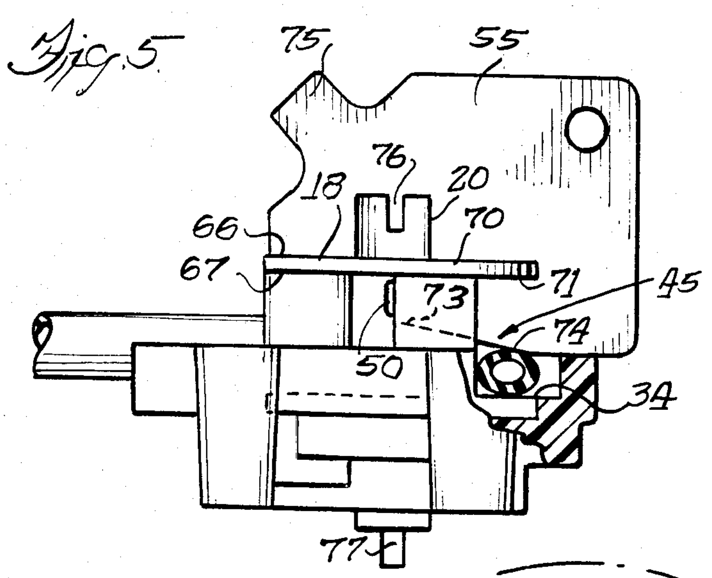
FIG. 5 illustrates the key interfitted with the rotor and compressing the tube.

As shown in the drawings for purposes of illustration, the invention is to be used with a peristaltic pump 10 such as the type shown in U.S. Pat. No. 3,358,609 which is used herein merely for purposes of illustration. It is to be understood that various other constructions of peristaltic pumps may be employed when using a tool or key 11 (FIG. 3) and the method hereinafter described for loading the compressible fluid tube or tubing 12 into the pump. In loading the pump, the tube 12 is generally positioned as shown in FIG. 4 with the tube 12 disclosed to partially encircle the rotatable rotor 14 which includes a plurality of compression rollers 15 on the rotor for compressing the tube. In this instance, the illustrated rotor 14 has three rotatable rollers 15 each of which is rotatable about a vertical pivot axle 16 extending vertically between an upper plate 18 and a lower plate 19 fixed to a central rotatable pump drive shaft 20.

The rotatable pump drive shaft 20 is mounted in suitable bearings 21 and 22, FIGS. 1 and 2, each mounted in a separable pump housing half or base 24 and 25. In this instance, the pump housing are separable and are formed of molded plastic and abut each other at a generally, centrally located interface 26, as best seen in FIG. 2. With the housing base 24 removed from the housing base 25, the rotor 14 will be exposed such as shown in FIG. 4 allowing the person doing the installing to loop the tube 12 above a cavity 30 which is an arcuate space between the rotor and a reaction member or wall 32. As best seen in FIGS. 2 and 4, the reaction member includes an arcuate horizontally extending wall 34 which defines the bottom or lower end of the cavity. It is to be understood that when the other half 24 of the housing is applied that a similar arcuate reaction wall matching in shape and size the reaction wall 32 will abut the tube 12 and compress the tube at the roller locations to define the completed reaction member.

Heretofore, when the tubing 12 was positioned, such as shown in FIG. 5, the operator would, with his fingers, position the tube, as shown in FIG. 4 over the cavity 30, and then try to push the tube down into the cavity 30 all about the circumference of the roller and then lay the lower side of the tube into the inlet groove 37 and the outlet groove 38 of the housing as best shown in FIG. 2. At the two or three locations where the rollers 15 are facing the cavity wall 32, the spacing is less than the diameter of the tube so that the loader must push the tube at these locations down into the cavity with the rollers squeezing the tube engage thereagainst to a smaller diameter such as the locations 40*a* and 40*b* shown in FIG. 6. It is difficult for some people lacking in manual dexterity or people who are inexperienced to push the tube at the points 40*a* and 40*b* shown in FIG. 6 while continuing to try to hold the tube through the remainder of the arcuate path to complete the operation of tube insertion into the cavity.

Figure 6:
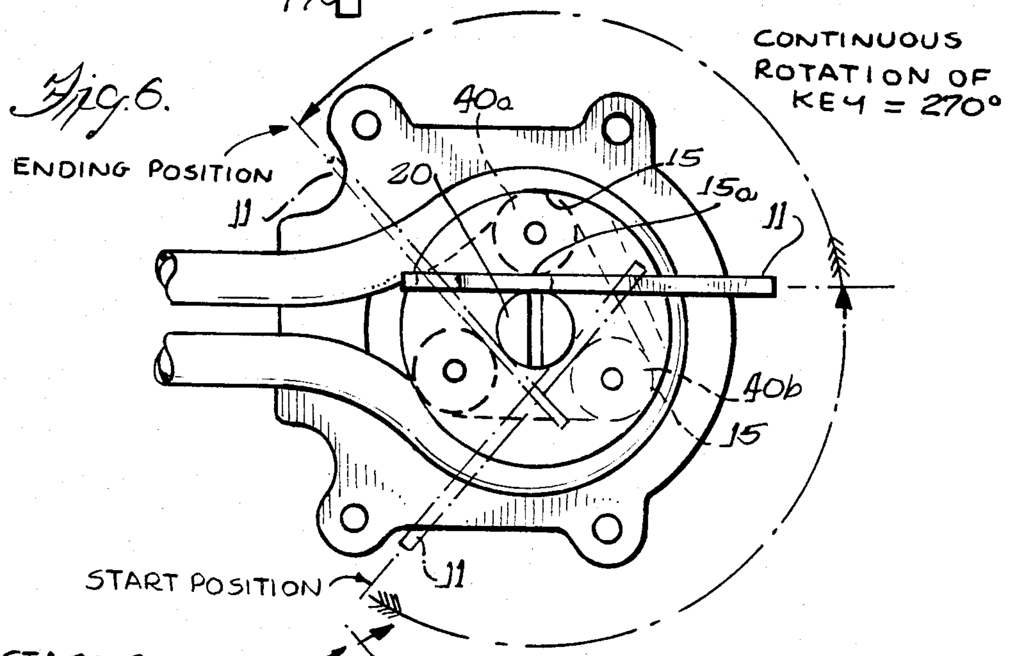
FIG. 6 illustrates the key being rotated counterclockwise to insert portions of the tube.
Figure 7:
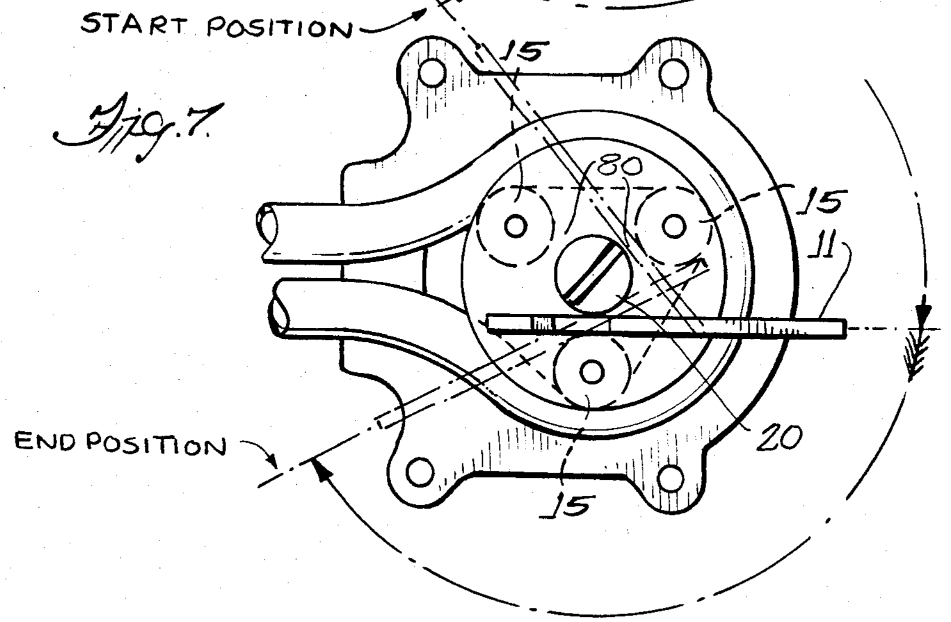
FIG. 7 illustrates a key being rotated clockwise to push the tube into the groove or cavity formed between the reaction member and the roller members of the rotor.

In accordance with the present invention, it is provided a new and improved method of loading the compressible fluid flow tube 12 into a cavity 30 in a peristaltic pump. More specifically, in accordance with the present invention there is provided a method in which the tube 12 is aligned over the cavity 30 and the key 11 is brought over the tube from the position generally shown in FIG. 4 and inserted into an inner fitting relationship with the rotor (FIG. 5). The key is then rotated to turn the rotor with a camming surface 45 on the key (FIG. 5) engaging and forcing the tube into the cavity as the key is turned to rotate the rotor. More specifically, the preferred method includes the innerfitting of a lower finger 50 on the key 11 into a space between a roller 15 and the rotor shaft 20, such as shown in FIGS. 6 and 7, and to having a slot 51 on the key receiving the upper plate 18 of the rotor to locate the key in a precise vertical height with respect to the cavity defining walls 32 and 34. The torque to turn the rotor and to slide the camming surface 45 along the top of tube is applied by the person's fingers to an upper large body portion 55 of the key. The key is shaped for easy grasping by the user to apply a turning torque to the rotor and to cause the lower camming surface 45 on the key to slide along the upper surface of the tube while forcing the same into the cavity as shown in FIGS. 5, 6 and 7.

Surprisingly, it has been found that the key also assists in providing a more uniform insertion and a more uniform operation for the pump because a more optimum length of tube 12 is inserted into the cavity 30. Sometimes with a manual operation the tube is stretched in the cavity by the person trying to insert the tube with the result that the inner diameter of the tube is reduced causing a decrease in the flow rate and also a stressing of the tube which can reduce the life thereof. On the other hand, a person compressing and stuffing too much of the tube in the cavity can also stress the tube which will adversely affect the life thereof.

Referring now in greater detail to the illustrated key 11, it is preferably made of a metal such as stainless steel and has a generally flat plate shaped body 60. To strengthen the lower finger 50 there may be indented to form an integral stiffening rib 60 which extends parallel to the slot 51. As shown in FIG. 3, the stiffening rib extends from one end 62 adjacent a vertical end wall 63 of the plate to another end 64 located adjacent free end 65 of the finger.

By way of example only, "the preferred key" measures a maximum of about 2 and $\frac{3}{8}$'s inches in width and 1 and 23/30th inches in height and is made from 0.048 inch thick stainless steel plate.

When the key 11 is inserted into the position shown in FIG. 5, an upper wall 70 for the slot 51 and a lower wall 71 for the slot abut upper and lower surfaces 66 and 67, respectively, of the upper rotor plate 18. Slot walls 70 and 71 are spaced apart by a dimension slightly larger than the thickness of the upper plate 18 so as to slide thereagainst to position the camming surface 45 at a precise height over the tubing 12 and the cavity 30. Herein the illustrated slot in this illustrated example of the invention may be 0.141 inch.

To facilitate the sliding of the finger 15 into a position between a roller 15 and the rotor shaft 20 and over the top of the tubing 12, it is preferred that the camming surface be provided with tapered camming wall 73. The tapered wall 73 extends downwardly and outwardly from free end 65 of the finger 50 a point 74 located adjacent the end of the slot as shown in FIG. 4.

This key is also preferably formed with a screwdriver type end prying or projection 75 which may be inserted into slot 76 (FIG. 2) on the first end of the rotor shaft 20 to turn the same. More specifically after the tube 20 is loaded and the pump halves are joined to form the pump, as shown in FIG. 1, the pump is then attached to the motor drive unit which has a motor output shaft to receive the tang 77 (FIG. 2) on the other end of the rotor shaft 20. With the pump positioned as shown in FIG. 1 with the motor drive unit being located behind the pump, a person will insert the screwdriver end 75 into rotor slot 76 and turn the rotor until the rotor tang 77 is aligned with the motor output shaft's slot (not shown). The tang 77 is pushed axially into the motor shaft slot to couple the rotor shaft 20 in driving engagement with the motor output shaft. The screwdriver end 75 thus provides a convenient tool to turn the rotor shaft to assist in its blind engagement the motor drive shaft. To assist in holding the key 11 in a convenient position, it may be provided with a hole 78 in an upper corner thereof.

Turning now to the peristaltic pump, the preferred axles 16 extend between the respective upper and lower rotor plates 18 and 19. In general, the rollers 15 are freely turning about their axles. The preferred rollers 15 are cylindrical and are in the form of sleeves mounted on the axles 16 for free turning about the axles which are stationary or fixably secured at their opposite ends to the respective plates 18 and 19. A space or gap 80 between a roller 15 and the rotor shaft defines a convenient slot for the finger 50 the thickness of which is sized to slide therebetween and thereby hold the key in a vertical plane. Thus, the key is held in vertical plane and at a precise vertical height over the tube 12 when interlocked with the rotor.

The upper half 24 of the housing of the peristaltic pump 10 also is formed with a cavity similar to the cavity for the lower housing half 25 and has a vertical arcuate reaction wall similiar to the reaction wall 32. When the top half is applied, the upper reaction wall squeezes inwardly the tubing slightly at the locations of the rollers 15 and causes the halves to have a tight fit with one another particularly as the bearing 22 is centered on and located on the upper end 81 (FIG. 2) of the drive shaft 20. The cylindrical lower end 82 of the drive shaft 20 is likewise fixed within the bearing 21 to define a precise vertical axis for the drive shaft 20 and the rotor 14 when the housing halves 24 and 25 are assembled as shown in FIG. 1. When disassembling the housing halves from the snug-fit arrangement, or snap-fit arrangement, the screwdriver end 75 may be inserted against the faces 26 of the respective halves 24 and 25 and turned to pry the upper half and the lower half to release their grip with the tube which is being compressed with their respective reaction walls.

From the foregoing, it will be seen that in the operation the operator will place the tubing 12 as shown in FIG. 4 over the cavity 30 with the key being brought into a position such as shown in FIG. 4 for inserting the free end 65 of the finger 50 into a space 84 (FIG. 4) between the top of the tubing 12 and the underside 67 of the upper rotor plate 18 with the inclined surface 73 of the finger sliding along the top of the tube until the key is inserted into the position shown in FIGS. 5 and 6. The key is inserted sufficiently that free end 65 of the finger 50 is inserted into a slot 80 (FIGS. 6 and 7) between a roller 15 and rotor shaft 20 to engage both of them. In this position, the key will be held in a vertical plane.

With the key fully inserted to abut end wall of the slot 51, the key is turned in a direction to cause the camming surface 45 on the lower surface of the key to revolve at a constant heighth with respect to the tube and the lower cavity wall 34 forcing the tube into the cavity particularly at the three locations at which the rollers 15 are located and at which the tubing must be compressed in a radial direction as shown in FIGS. 5 and 6. Turning now to FIG. 6, a righthanded person would probably load the pump by rotating the key 11 in a counterclockwise direction between the starting position and ending position. At the starting position, the key is inserted between the rotor 20 and the compression roller 40*b* with the operator's left thumb over the tube 12 with the pump halve 25 being held in the left hand, and the key 11 being turned with the right hand through 270° to the illustrated ending position. On the other hand, a person who is left handed will probably hold the pump halve in his right hand with his right thumb over the tube 12 at the starting position labeled in FIG. 7, and with his left hand swing the key in a clockwise direction to the ending position. Thus, one hand can be used to hold the pump halve with the thumb gripping the tube at the slot at the start position and the key is swung with the other hand away from the thumb gripping the tube. After the tubing is properly positioned within the cavity, so that the other half 24 of the housing may be positioned over the upper end 81 of the shaft 20 with the tubing inlet and outlet ends being received in the inlet and outlet grooves 37 and 38.

The peristaltic pump illustrated herein need not be described in greater detail as it is commercially available from the assignee of this invention and is described in U.S. Pat. No. 3,358,609.

From the foregoing, it will be seen that the present invention provides a new and improved manner of loading of a fluid flow tube in a peristaltic pump. It is apparent that the pump illustrated herein is by way of illustration only and that there is other constructions of peristaltic pumps may be used with the method and with a key or tool as herein described above. Manifestly, the size and shape of the key or tool may be changed substantially from that illustrated herein and still fall within the purview of the claims of this invention. The term "key" and "tool" are used interchangeably herein, and the use of the term "key" herein is not by way of limitation.

The present invention has been described in terms of the preferred embodiment, but certain changes may be made, some of which may immediately be apparent, and others of which may be apparent only after some study, without departure from this invention.

What is claimed:

1. A method of installing a flexible flow tube in a cavity in a peristaltic pump between compression rollers on a rotor and a reaction member on a pump housing, said method comprising the steps of:

aligning the tube over the cavity, interconnecting the key and the rotor contacting the tube with a key and rotating the key having a portion connected to the rotor, and forcing an engaged portion of tube with the key into the cavity as the key is turned and cams the tube to compress the tube between the compression rollers and the reaction member.

2. A method in accordance with claim 1 in which the interconnecting step includes inserting said portion of the key into the rotor between rollers and a rotor shaft and in which a torque is applied to the key to turn the rotor.

3. A method in accordance with claim 2 including the step of holding a portion of the pump in one hand with the thumb of the one hand holding the tube and turning the key with the other hand away from the thumb of the one hand while forcing the tube into the cavity.

4. A method in accordance with claim 1 including the step attaching the key to a plate on the rotor with the key having a fixed vertical planar relationship to the tube and a fixed height over the cavity so that rotation of the rotor and key cams the tube down for a uniform distance from the bottom of the cavity.

5. A key for installing a flow tube in a cavity of a peristaltic pump having a rotor, said key comprising:

a body having an upper portion to be gripped by the fingers to apply a torque to turn the rotor, interfitting means on the body to interfit with the rotor to turn the same and to locate the key at a predetermined vertical distance with respect to the tube, and a camming surface on the key located at said predetermined distance to engage the tube and to force the tube into the cavity as the key and rotor are turned.

6. A key in accordance with claim 5 in which the interfitting means includes a slot for receiving a plate of the rotor therein, and a finger below the slot to slide beneath the plate to engage a roller rotor and shaft.

7. A key in accordance with claim 6 in which the slot includes upper and lower parallel surfaces to engage the top and bottom surfaces of the rotor plate and to assist in holding the key at said predetermined vertical distance.

8. A key in accordance with claim 7 in which said body is flat.

9. A key in accordance with claim 5 in which a prying projection is formed at one end of the key.

10. A key in accordance with claim 9 in which the key is formed with a hole therein.

11. A key in accordance with claim 5 in which said key is a substantially planar plate and in which said interfitting means includes a horizontal slot and a horizontal finger located below the slot.

12. A key in accordance with claim 11 in which a tapered cam surface is located on a lower edge of the finger to slide over the flow tube.

* * * * *